United States Patent
Beeferman et al.

(10) Patent No.: US 6,701,309 B1
(45) Date of Patent: Mar. 2, 2004

(54) METHOD AND SYSTEM FOR COLLECTING RELATED QUERIES

(75) Inventors: Doug Herbert Beeferman, Waltham, MA (US); Andrew Robert Golding, Waltham, MA (US); Michael John Witbrock, Newton, MA (US)

(73) Assignee: Lycos, Inc., Waltham, MA (US)

( * ) Notice: Subject to any disclaimer, the term of this patent is extended or adjusted under 35 U.S.C. 154(b) by 0 days.

(21) Appl. No.: 09/553,802

(22) Filed: Apr. 21, 2000

(51) Int. Cl.[7] .............................................. G06F 17/18
(52) U.S. Cl. .................... 707/3; 707/4; 707/5
(58) Field of Search .................. 707/3, 4, 5, 1, 707/2, 10, 513, 6

(56) References Cited

U.S. PATENT DOCUMENTS

| | | | |
|---|---|---|---|
| 5,488,725 A | | 1/1996 | Turtle et al. ................ 395/600 |
| 5,832,475 A | * | 11/1998 | Agrawal et al. ................ 707/2 |
| 5,878,426 A | | 3/1999 | Plasek et al. ................ 707/102 |
| 6,014,665 A | | 1/2000 | Culliss ........................... 707/5 |
| 6,263,334 B1 | * | 7/2001 | Fayyad et al. .................. 707/5 |
| 6,295,529 B1 | * | 9/2001 | Corston-Oliver et al. ...... 707/3 |
| 6,298,348 B1 | * | 10/2001 | Eldering ...................... 707/10 |
| 6,363,378 B1 | * | 3/2002 | Conklin et al. ................ 707/5 |
| 6,389,436 B1 | * | 5/2002 | Chakrabarti et al. ........ 707/513 |
| 6,405,188 B1 | * | 6/2002 | Schwartz et al. .............. 707/3 |

OTHER PUBLICATIONS

Search Report dated Jul. 17, 2001 for corresponding PCT Application No. PCT/US01/12597.

* cited by examiner

Primary Examiner—Sanjiv Shah
(74) Attorney, Agent, or Firm—Ohlandt, Greeley, Ruggiero & Perle, L.L.P.

(57) ABSTRACT

A method for collecting related queries, comprising the steps of obtaining a first query and a second query that have been submitted during a search for data, and determining whether the first query and the second query have a likelihood of being submitted by a class of searcher.

35 Claims, 4 Drawing Sheets

METHOD AND SYSTEM FOR COLLECTING RELATED QUERIES

BACKGROUND OF THE INVENTION

1. Field of the Invention

The present invention relates to queries submitted during a search for data, and more particularly, to a technique for collecting related queries.

2. Description of the Prior Art

The Internet is an extensive network of computer systems that allows a user to connect with various computer servers or systems. The Internet permits users to send and receive data between computers connected to this network. The data may include web sites, home pages, databases, text collections, audio, video or any other type of information made available over the Internet from a computer server connected to the Internet. The data, collectively referred to as "articles", may also include key terms representing selected portions of the information contained in the article. These key terms are available over the Internet to other computers and permit these other computers to locate an article.

To locate articles on the Internet, a user of a remote computer searches for the key terms using a search program known as a search engine. Examples of search engines currently available on the Internet include Lycos™, Yahoo!™, Excite™, and Alta Vista™. These search engines allow the remote user to submit a request for information in the form of a search query. The search query includes one or more search terms, typically in a combination of words. The search terms may be connected by Boolean logic operators, truncated or combined with wild card terms. The search engine then compares the search query with the key terms from the articles and retrieves at least a portion of the articles having key terms that match the search query. The search engine then displays to the user the portion of the article such as the title. The user can then scroll through these retrieved portions of the articles and select a desired article.

A system for query refinement or reformulation introduces the user to queries that can be issued instead of or in addition to his initial search query. One purpose of query refinement is to improve the user's search experience by suggesting queries that more closely capture his real information needs. Common refinement strategies include:

(1) suggesting a superstring of a first query, e.g., suggesting "antique furniture" for the query "antique";
(2) stemming, which suggests a phrase that is not a literal superstring, e.g., suggesting "New Mexican" for the query "Mexicans";
(3) suggesting an alternate spelling or a corrected spelling for a query;
(4) suggesting words to add to a query;
(5) suggesting a synonym of a query; and
(6) suggesting a homonym of a query.

These techniques typically obtain their suggestions from a static list, lookup table, catalog or thesaurus.

U.S. Pat. No. 6,014,665 to Culliss (hereinafter "the Culliss patent"), entitled "Method For Organizing Information", pertains to a method for organizing information in which the search activity of users is monitored. Thereafter, the activity is used to suggest terms for addition to a search query. The method operates by maintaining a key term matching score for a grouping of terms that are entered together in a search query. For example, when a user enters a search query, "Alpha AND Gamma", the key term matching score for the key term grouping Alpha-Gamma will be altered to reinforce a relationship between the terms Alpha and Gamma.

The applicants recognized that a potential relationship might exist between terms that are submitted by a searcher, but not necessarily entered in the same query. For example, a person performing a search may submit more than one query, over a period of time, in pursuit of some particular information.

The applicants also recognized that a person might submit a first query and a second query in searches for unrelated information, yet the queries are related in that they can provide some insight into the varied interests of the person. Furthermore, when considering the behavior of a class of people sharing similar interests, members of that class may have a tendency to submit both the first query in a search for information relating to a first interest, and the second query in a search for information related to a second interest.

Additionally, the applicants recognized that a suggestion of an alternate query can be refined by monitoring a searcher's tendency to utilize information that is presented to the searcher after executing a search based on the alternate query.

Accordingly, there is a need for a method for collecting related queries that have a likelihood of being submitted by a class of searcher.

There is also a need for a method that utilizes related queries to refine a presentation of an alternative query to a first query based on a searcher's tendency to utilize information that is presented to the searcher after executing a search based on the alternate query.

SUMMARY OF THE INVENTION

In accordance with a first method of the present invention, a method is provided for collecting related queries. The method comprises the steps of obtaining a first query and a second query that have been submitted during a search for data, and determining whether the first query and the second query have a likelihood of being submitted by a class of searcher.

In accordance with a second method of the present invention, a method is provided for refining a presentation of an alternative query to a first query. The method comprises the steps of presenting a second query to a searcher that has submitted the first query, determining whether the searcher thereafter submits the second query, and determining whether the searcher thereafter utilizes information presented to the searcher if the searcher submits the second query.

In accordance with a third method of the present invention, a method is provided for refining a search for data in a database. The method comprises the steps of determining that a first query and a second query have a likelihood of being submitted by a class of searcher, receiving a communication indicating that a searcher has submitted the first query in a search for data, and presenting the second query to the searcher.

DETAILED DESCRIPTION OF THE INVENTION

To locate articles on the Internet, a user of a remote computer searches for the key terms using a search engine. A system for query refinement or reformulation introduces the user to queries that can be issued instead of or in addition to his initial search query.

One objective of a query refinement system is to improve the user's search experience by suggesting queries that more closely capture his real information needs. Many users perform searches that are hopelessly vague or hopelessly specialized. A good query refinement system can push the user in fruitful directions by presenting a palette of alternatives, some of which are semantically closer to the user's true intent. This objective encompasses the question "What did the user mean to say?" Possible answers to this question include:

1. Exactly what he said.
2. A specialization of what he said. If he searches for "recipes", perhaps he would prefer to focus on "dessert recipes". This kind of refinement is very common and is usually achieved by showing commonly queried superstrings of a search term or its base form.
3. A generalization of what he said. Likewise, the user might be unaware that his query is too focused. If he searches for "good politics sites", perhaps the results for "government" or "politics" would be more to his liking.
4. A rewording of what he said. Synonymy is one of the well-studied nemeses of information retrieval. If a user queries "automobiles" he will miss documents that contain simply "cars".
5. A spelling-corrected and typographic error-corrected version of what he said. Search queries often contain a misspelling or a typographic error. If he searches for "desert-recipes", it is more likely that he wants "dessert recipes" than Saharan cuisine.

Another objective of a query refinement system is to improve overall user satisfaction by replacing potentially poor user experiences with potentially good ones. For example, if a user issues the query "kool MP3z", he might miss out on some of the more respectable MP3 search sites in the results for "MP3". If the system suggests to him that he refine his query to "MP3" and he does, we gain an improved result experience.

A query refinement system may offer a refinement suggestion that is unrelated to an original query. That is the system might address the issue of, "For what else might the user be interested in searching?" or, "For what might the user search next?" Having searched for "coffee", might he,also wish to search for "food"?

The process of query refinement can be seen as a multi-step process in which the user's re-use of the search engine generates a train of increasingly targeted page views. The increased number of page views is generally an attraction for advertisers who may wish to sponsor the search engine, and the final search result is more likely to contain keywords subscribed to by the advertisers.

A good candidate for an alternate query to a first query is likely to be a second query that tends to be issued by searchers who have also issued the first query. For example, searchers who issue a query for "coffee" may also tend to issue a query for "food". One benefit of offering an alternate query is that it promotes related interests, much like a collaborative recommendation system. That is, an individual searcher who has submitted a query for "coffee" may appreciate a suggested alternative query for "food", by saying to himself, "That's a good idea. I should search for 'food'."

The alternate query can also be used to encourage a searcher to pursue information that is not objectively related to the information the searcher might have been seeking when submitting the first query. For example, a searcher who submits a query for "wrestling" might appreciate a suggestion of the alternative query "NASA", particularly if the searcher is also a 14 year old male. So, the alternate query may be of particular value to a class of searcher in which members of the class share a common interest. Fortuitously, the class of searcher may also share demographic characteristics such as, age, sex, ethnicity, nationality, or they may reside in a common geographic location.

The present invention concerns a technique for collecting related queries that have a likelihood of being submitted by a class of searcher. The queries could be related either because they seek similar information, or because they are directed toward interests shared by members of the class although the underlying information is objectively unrelated. After collection, the related queries can be used in a query refinement system to suggest alternate queries to a searcher.

The freshness of a suggested alternative query is an important consideration in a system of query refinement. This is especially true, for example, if the system is expected to handle queries that may reflect social changes, social trends, or current events. Preferably, the alternative query should be relevant in the sense that it helps the searcher to focus his search, or it should be suggestive of a new search in a direction that piques the interest of the searcher. Such objectives are well served by studying the behavior of a large population of searchers.

The searching behavior of a population can conceivably be evaluated one member at a time by monitoring the queries that are submitted by each member through a single computer interface. However, such an approach would probably not provide a very timely or varied assortment of queries. On the other hand, an Internet search engine is a convenient point for collecting a large number of timely queries from a diverse population. Nonetheless, albeit convenient, because the search engine receives queries from many sources there remains a challenge to determine which queries are submitted from a particular source.

One embodiment of the present invention is a method for collecting related queries. The method comprises the steps of obtaining a first query and a second query that have been submitted during a search for data, and determining whether the first query and the second query have a likelihood of being submitted by a class of searcher.

Any convenient source of queries can be use, but in a preferred embodiment, the method partitions a search engine query log into user sessions that are believed to represent the search activity of a single user over a period of time, and thereafter extracts pairs of queries that occur within the sessions. A session is an interval of time during which a single user executes one or more searches. The interval of time may be of a predetermined length, although such is not required. A user session is recognized by identifying the source of a set of queries, for example, from an Internet Protocol (IP) address. However, any appropriate technique may be used for identifying the source of the queries, such as by using data from a hypertext transfer protocol (HTTP) management mechanism, such as a cookie, that is stored in a computer from which a search is being performed, or an identifier assigned by a search engine.

The class of searcher can be either (1) a single searcher or (2) a plurality of searchers having a trait in common with one another. In the latter case, the particular trait of the class is not necessarily important, and individual members of the class are not necessarily recognized as such. Rather, class membership is based on the premise that members of the class merely share some common interests. The common interests are assumed from a tendency of the members to submit the same, or similar, queries as one another.

Another way of looking at whether the first and second queries have a likelihood of being submitted by a class of searcher is to determine whether the first and second queries have a likelihood of being submitted by a single searcher. This likelihood is determined from a heuristic or statistical analysis of a plurality of searches. A stronger relationship will be found between the first and second queries if both queries have been submitted in a plurality of searches.

The order in which the queries are submitted may be relevant, for example to determine a sequence of queries used by a searcher when narrowing a search, but it is not necessarily important. Accordingly, the adjectives "first" and "second" are used herein to distinguish between queries, and, in general, the terms do not necessarily designate any particular ordinal or chronological sequence in which the queries are submitted. The step of determining whether the first and second queries have a likelihood of being submitted by a class of searcher comprises determining whether a permutation of the first and second queries has been submitted in a plurality of searches.

Figure 1:
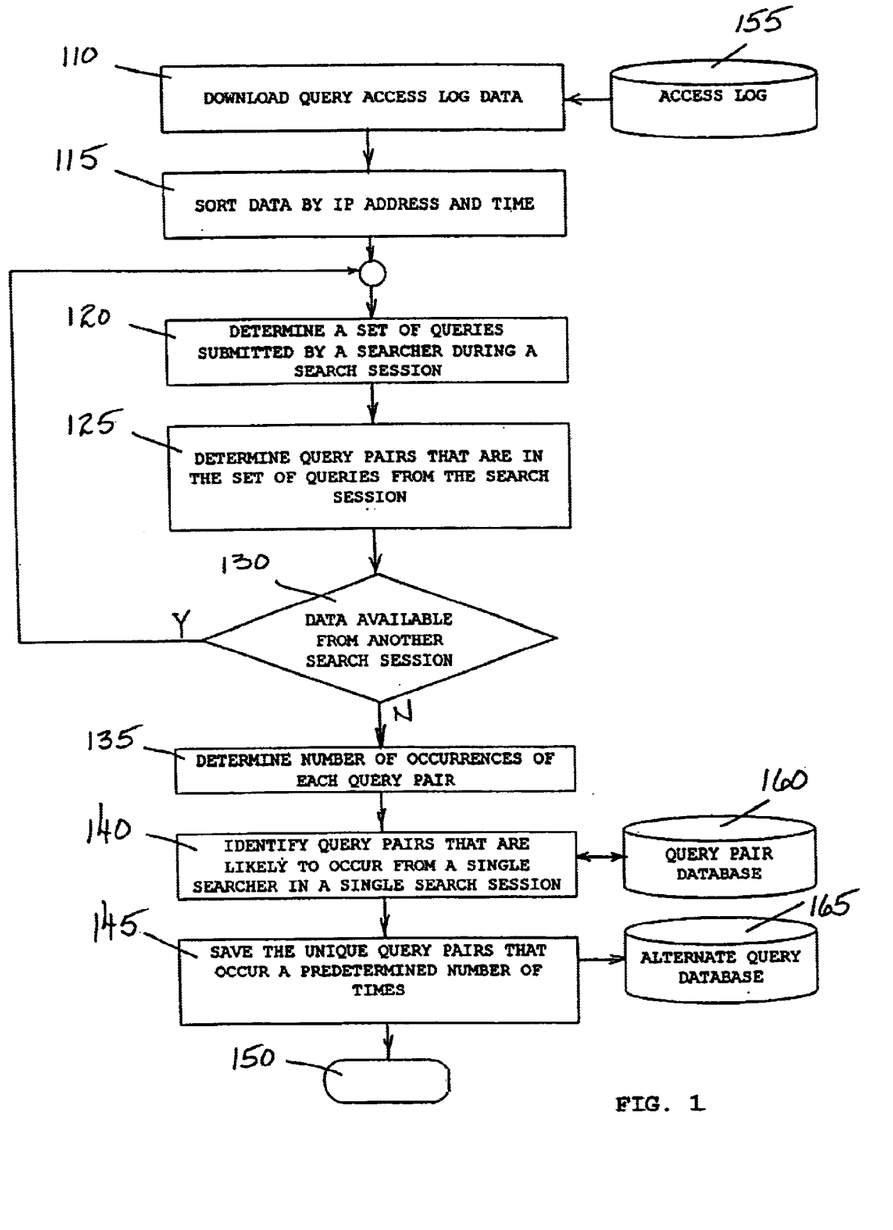
FIG. 1 is a flowchart of a method for collecting related queries in accordance with the present invention.

FIG. 1 is a flowchart of a method for collecting related queries in accordance with the present invention. The method begins with step 110.

In step 110, the method downloads data from a query access log 155 from a search engine. The access log 155 is organized into records, each of which include a query, an identifier indicating a source from which the query was submitted, and a time at which the query was submitted. In the preferred embodiment, the identifier is an Internet Protocol (IP) address. The method then progresses to step 115.

In step 115, the method sorts the data using the IP address as a primary key and the time as a secondary key. Note that because the IP address is used as a primary key, all of the queries from a particular IP address will be grouped together. Within a given IP address group, the queries are further sorted by time. The method then progresses to step 120.

In step 120, the method determines a set of queries submitted by a searcher during a search session. The object here is to obtain a set of queries that are submitted by a single user during a single user session. Such a set can be found from the sorted data provided by step 115.

The first and second queries are members of a set of queries in which a difference in time of submission between successive queries in the set is less than a predetermined value. The predetermined time is selected to delimit the group of queries from an IP address into subgroups of queries that are probably from different users. That is, if the times between successive queries from a given IP address are less than the predetermined time, then the queries are likely to be from a single user. Conversely, if a time between successive queries from a given IP address is greater than the predetermined time, then the queries are assumed to have been submitted by different users. Accordingly, the predetermined time can be any appropriate value.

Consider the following example using a predetermined time of 240 seconds, and queries submitted at the times set forth in Table 1.

TABLE 1

| Query | Time Submitted (HH:MM:SS) | Time Difference From Previous Submission (Seconds) | User Session |
| --- | --- | --- | --- |
| Q1 | 12:00:00 | — | A |
| Q2 | 12:00:30 | 30 | A |
| Q3 | 12:04:00 | 210 | A |
| Q4 | 12:07:00 | 180 | A |
| Q5 | 12:15:00 | 480 | B |
| Q6 | 12:18:00 | 180 | B |
| Q7 | 12:28:00 | 600 | C |
| Q8 | 12:32:30 | 270 | D |

The difference in time between Q1 and Q2 is 30 seconds, the difference between Q2 and Q3 is 210 seconds, the difference between Q3 and Q4 is 180 seconds, and the difference between Q4 and Q5 is 480 seconds. Because the successive differences between Queries Q1, Q2, Q3 and Q4 are each less than 240 seconds, these queries are regarded in a set, in this case associated with User Session A.

Because the difference between Q4 and Q5 is 480 seconds, which is greater than 240 seconds, Q5 is assumed to have been submitted by a different user than that of User Session A. Accordingly, Q5 is considered to be the first query of User Session B.

The difference between Q5 and Q6 is 180 seconds, and the difference between Q6 and Q7 is 600 seconds. Therefore, Queries Q5 and Q6 are regarded as a set associated with User Session B.

The difference between Q7 and Q8 is 270 seconds. Accordingly, Q7 is a stand-alone query associated with User Session C. Q8 is associated with User Session D, which may include subsequent queries that are not represented in Table 1.

Step 120 can include the sub-steps of (1) discarding queries if a rate of query submission from a particular source exceeds a predetermined rate, and (2) discarding queries from an undesired source. An undesired source can be identified, for example, by its uniform resource locator (URL). These sub-steps are intended to screen out queries that are received from a proxy server. Queries from a proxy server are undesirable because the proxy server is typically a common point through which multiple users may concurrently submit queries. Consequently, additional processing would be required to identify queries from a single user.

For the purpose of illustrating other aspects of the present invention, assume that a first pass through step 120 will yield the set of queries associated with User Session A, as shown in Table 1. After step 120 is completed, the method progresses to step 125.

In step 125, the method identifies pairs of queries in the set provided by step 120. For example, as described above, Q1, Q2, Q3 and Q4 comprise a set associated with User Session A. The query pairs of this set are (Q1,Q2), (Q1,Q3), (Q1,Q4), (Q2,Q3), (Q2,Q4) and (Q3,Q4).

Step 125 may perform one or more preliminary processes to normalize an individual query so that it can be compared to other queries. Such processes can include, for example:

(1) converting a non-printable character to a space in a query, (2) replacing consecutive spaces with a single space in a query, (3) removing a quotation mark from a query, and (4) converting an alpha character to its uppercase representation in a query.

Additionally, step 125 considers a first query and a second query to be a valid query pair only in a case where the first query is not identical to the second query, and where the first query is not a plural of the second query. For example, if the first query can be produced from the second query by adding "s" or "es", then the first query is a plural of the second query. Note that the reverse scenario is permitted.

Step 125 may also perform one or more preliminary processes to improve the integrity of an individual query. Such processes can include, for example:

(1) discarding a query in a case where the query comprises a number of characters that is not within a predetermined range of numbers, e.g., discarding a query if it does not have at least two character, or if it has more than twenty-five characters, and (2) discarding a query in a case where the query comprises a uniform resource locator as judged by whether the query contains the sequence "http" or ".com", e.g., the query "lycos.com" would be discarded.

Since the techniques that drive query refinement are largely data driven, pornographic suggestions are inevitable. Without any filtering, nearly any celebrity that you query will lead to the suggestion that you search for that celebrity nude. Arguably this is what some users may want, but these users can easily bypass a refinement interface and express their needs accurately the first time. Not only does the presence of pornographic web sites undermine family-oriented strategy, but they also "pollute" suggestion lists for innocuous queries, harming the user experience even for porn-tolerant users. The present invention therefore strives to suppress pornographic suggestions to the greatest extent possible by filtering out pornographic words from all results using as a stoplist the keywords most highly correlated with pornography. Accordingly, step 125 also discards a query in a case where the query includes a term from the group consisting of a pornographic term, a violent term, a hateful term, an ethnically derogatory term, or any other predetermined objectionable term.

After completion of step 125, the method progresses to step 130.

In step 130, the method determines whether data is available from another search session. If step 130 determines that data is available from another search session, then the method branches back to step 120. If step 130 determines that data is not available from another search session, then the method advances to step 135.

For example, if step 125 has just processed the data from User Session A, then the method will branch back to step 120 to process the data from User Session B. The method continues to loop about steps 120, 125 and 130 until all of the data from access log 155 has been processed. In practice, access log 155 may contain millions of records, so accordingly, millions of query pairs may be assembled.

In step 135, the method determines the number of occurrences of each query pair that was submitted in a plurality of searches. That is, it determines the number of occurrences of each query pair that was found during the processing of steps 120, 125 and 130.

Assume for example that there exist twenty user sessions X1 through X20, which involved twenty independent searchers, possibly at twenty different locations in the United States. Assume further that each of the twenty searchers submitted both of the queries, "patent" and "trademark". Assume also that five user sessions, X21 through X23, each submitted both of the queries "leather" and "patent leather". The processing loop of steps 120, 125 and 130 would therefore assemble an occurrence of the query pair (patent, trademark) for each of user sessions X1 through X20, and an occurrence of the query pair (leather, patent leather) for each of sessions X21 through X25. Accordingly, step 135 would determine that the query pair (patent, trademark) occurred twenty times, and the query pair (leather, patent leather) occurred five times.

After completion of step 135, the method advances to step 140.

In step 140, the method identifies query pairs that are likely to occur from a single searcher in a single search session. This can be achieved by determining whether the number of occurrences of a particular query pair is greater than a predetermined number.

So, if the predetermined number is three, the method would conclude that the queries "patent" and "trademark", which comprise a query pair that occurred twenty times, have a likelihood of being submitted by a single searcher in a single search session. Likewise, the method would conclude that the queries "leather" and "patent leather", which comprise a query pair that occurred five times, also have a likelihood of being submitted by a single searcher in a single search session.

Step 140 processes data from, and then updates, a query pair database 160. Query pair database 160 contains counts of occurrences of query pairs that were found during previous executions of the method shown in FIG. 1. Accordingly, step 140 considers not only the number of occurrences of query pairs found during the most recent processing of step 135, but also the number of occurrences of query pairs retained in query pair database 160. For a given query pair, the total number of occurrences is the sum of the number found in step 135 and the number from query pair database 160. This total is then merged into query pair database 160. For example, the twenty occurrences of the query pair (patent, trademark) and the five occurrences of (leather, patent leather) will be merged into query pair database 160. By utilizing query pair database 160, the method takes advantage of a broader spectrum of queries collected over a longer interval of time than that which is represented in access log 155 alone.

Upon completion of step 140, the method progresses to step 145.

In step 145, the method saves, into an alternate query database 165, unique query pairs that occur a predetermined number of times. One of the uses of a query pair comprising a first query and a second query is that in a case where a searcher submits the first query, the second query can be suggested to the searcher as an alternate query. More than one alternate query can be suggested to the searcher, yet only a select group of the most useful alternates should be suggested. The purpose of step 145 is to limit the number of alternate queries to some reasonable quantity.

Assume that the predetermined number is fifty, although any appropriate number can be used. Assume also that after the processing of step 140, the query pair (patent, trademark) was found to have occurred seven hundred times. Accordingly, the query pair (patent, trademark) would be entered into the alternate query database 165.

After completion of step 145, the method progresses to step 150.

In step 150, the method for collecting related queries terminates. In practice, this method can be run periodically, such as once a week. This would allow for access log 155 to acquire an adequate pool of new queries, and it would further serve to provide fresh query pairs for query database 160 and alternate query database 165.

The processing of steps 135, 140 and 145 in conjunction with query pair database 160 and alternate query database 165 is intended to determine whether the first query and the second query have a likelihood of being submitted by a class of searcher. These steps determine a number of occurrences of a query pair that are submitted in a plurality of searches, and use the number of occurrences to determine whether the first and second queries have the likelihood of being submitted by the class of searcher.

When a first and second query have a likelihood of being submitted by the class of searcher, the queries are considered to be related. To determine whether such a relationship exists, the method can apply a common sense knowledge database, or a technique for evaluating an actual number of occurrences of a query against an expected number of occurrences of the query. For example, as an alternative to steps 135, 140 and 145 as described above, which use predetermined numbers as thresholds, the method can evaluate a ratio between an actual number of occurrences of a query pair and an expected number of occurrences of the query pair. Such a ratio will indicate a degree of correlation between the first query and the second query. The closer the correlation, the greater the likelihood that the first and second queries are submitted by the class of searcher. The ratio can be evaluated using any technique for evaluating a ratio between an observed number of events and an expected number of events such as mutual information analysis or a chi-squared ($\chi^2$) test.

The mutual information for two queries (a, b) is defined to be the ratio between the empirical probability that both a and b appear together in a given user session, and the probability assigned by a model. The model assigns to (a, b) the co-occurrence probability dictated by the independence assumption, namely the product of the empirical probability that a occurs in a given session with the empirical probability that b occurs in a given session. The query pair (a, b) will be retained if the pair meets a minimum mutual information threshold.

In a chi-squared ($\chi^2$) test, deviations, that is observed values minus expected values, are squared, divided by the expected values, and summed. The value of $\chi^2$ is then compared with values in a statistical table to determine the significance of the deviations.

Another alternative to the processing of steps 135, 140 and 145 is to evaluate a ranking of mutual information values for query pairs. A first and second query are regarded as a first unique query pair. The first query may also be the first query in N unique query pairs that have been submitted in a plurality of searches. The method determines a number of occurrences of each of the N unique query pairs submitted in the plurality of searches, and uses a number of occurrences of the first unique query pair and the number of occurrences of each of the N unique query pairs to determine whether the first and second queries have a likelihood of being submitted by a class of searcher.

Each of the N unique query pairs has a mutual information value, and each of the N unique query pairs has a rank ordered according to its mutual information value where a greatest rank corresponds to a greatest mutual information value. The first and second queries are found to have the likelihood of being submitted by the class of searcher if the rank of the first unique query pair is greater than a predetermined rank.

Consider the following example using sample data from Table 2. Assume that that a query pair (patent, trademark) is under consideration, so it is regarded as a first unique query pair. The query, "patent", is the first query in six unique query pairs, hence N=6. The number of occurrences of each of the six unique query pairs, and their corresponding mutual information values are set forth in columns two and three, respectively, of Table 2.

TABLE 2

| Query Pair | Number of Occurrences | Mutual Information Value | Mutual Information Ranking |
|---|---|---|---|
| patent, trademark | 750 | 0.90 | 2 |
| patent, fiber optics | 30 | 0.10 | 4 |
| patent, hair loss | 25 | 0.09 | 5 |
| patent, walnuts | 20 | 0.08 | 6 |
| patent, lawyer | 800 | 0.92 | 1 |
| patent, high-tech | 150 | 0.30 | 3 |

The query pair (patent, lawyer) has the highest mutual information value, i.e., 0.92, and thus, the rank, i.e., 1. The query pair, (patent, trademark) has the second highest mutual information value, and thus, the second rank. The query pair (patent, high-tech) has the third highest mutual information value, and thus, the third highest rank.

If the method is designed to accept a query pair with a rank greater than four, then the method would accept the query pairs of (patent, lawyer), (patent, trademark) and (patent, high-tech). In this example, a first query of "patent" and a second query of "trademark" would be considered as having a strong likelihood of being submitted by a class of searcher because the rank of query pair (patent, trademark) is greater than four.

Related queries can be used to suggest alternate queries. For example, a system receiving a communication indicating that a searcher has submitted one of a first query and a second query can send the other of the first and second queries to the searcher as a suggested alternate query. Similarly, the one query can be used to enhance a search for the other query. For example, a person searching for "patent" may appreciate being directed to information that would be revealed by a more specific search for "patent" AND "trademark". Even more helpful may be the case where a person who first searches for "patent" and then searches for "trademark" is directed to information that has been selected by other users who have also submitted queries for both "patent" and "trademark".

Related queries can also be used it aid in a selection of an advertisement. For example, given that a searcher has submitted a query for "patent", the searcher may appreciate being presented with an advertisement related to "trademark".

Given a user's query Q, the query refinement method presented above returns other queries that are often asked by users who ask query Q. One consequence of this method is that it returns these other queries whether or not the users were satisfied with their results. For example, suppose query Q is "Coffee". Users that issued this query may also have queried for "Cafe", "Java", and "Cofee" (sic). Users are unlikely to have been satisfied with the results of the last of these queries, because "cofee" is a misspelling. It is desirable to suppress suggestions of such queries in the future, to avoid leading the user down unproductive paths, and to maintain the user's confidence in the system's recommendations.

When the results of a query are not satisfying, such a situation can be detected by using a simple heuristic that counts the average number of clicks that a query receives on its search results. More specifically, we can sum the number of clicks in the click logs that each search result of a query Q receives, and divide by the number of times in the access logs that query Q was issued. The rationale for this heuristic is that an uninformative query, such as "Cofee", will yield results that will clearly be irrelevant to a user searching for coffee—a dentist named Dr. Bernie Cofee, a company with the acronym COFEE, and so on—and thus users will rarely click on them. On the other hand, if the user is enticed into clicking on many of the search results, then the query is probably a reasonable one.

This measure of query satisfaction can be incorporated into the query refinement algorithm in a variety of ways. In a preferred embodiment, the query refinement algorithm can generate an ordered list of queries, and suppress any queries in the list whose average click rate is below a predetermined threshold. An alternative embodiment would involve combining the query refinement algorithm's mutual information score and the average click rate into an overall score for each query, ordering the queries according to their overall scores, and again suppressing queries whose overall score falls below a predetermined threshold. The combination of scores can be done in a variety of ways, for example, expressing each score as a number of standard deviations away from the mean of its distribution, and then multiplying the two scores together to form an overall score.

Figure 2:
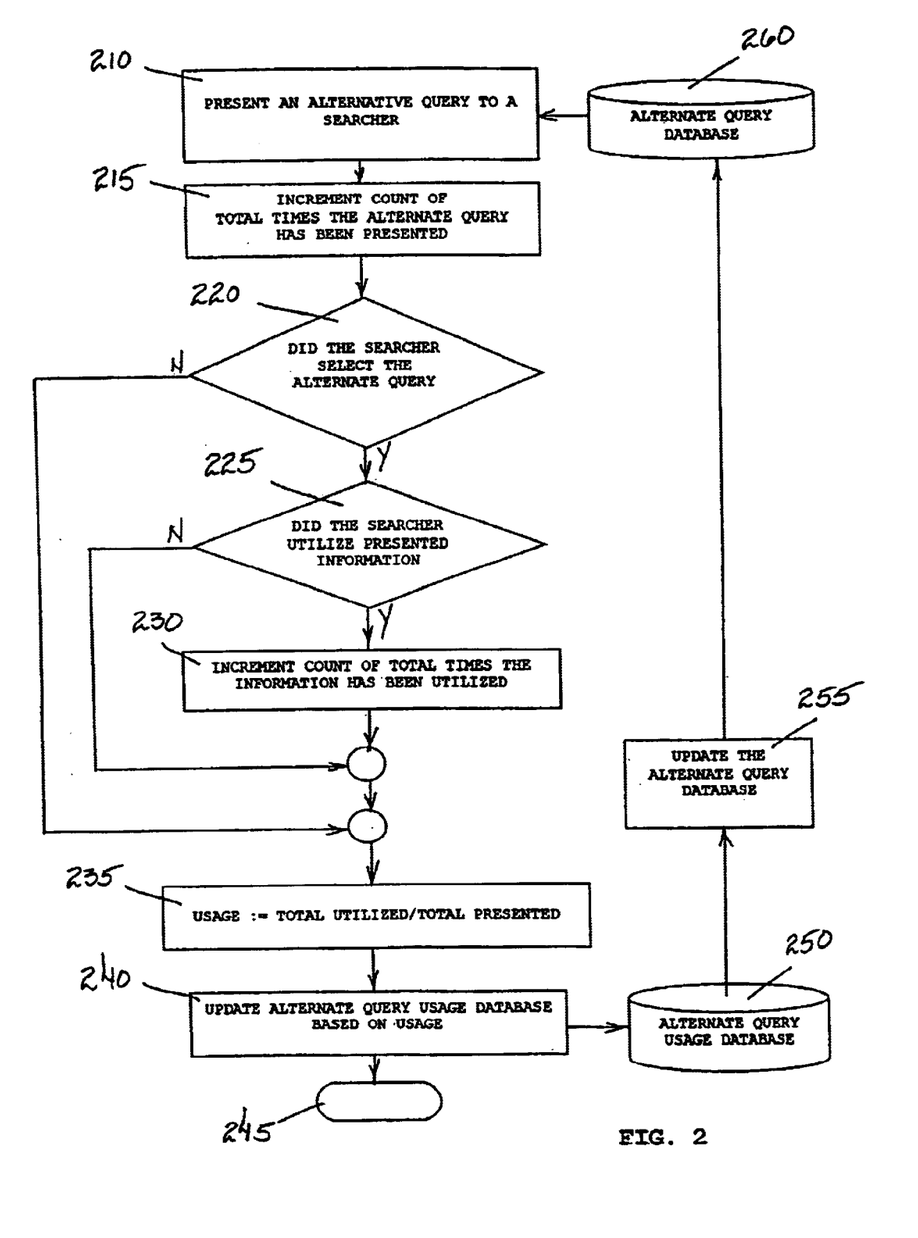
FIG. 2 is a flowchart of a method for refining a presentation of an alternate query to a first query in accordance with the present invention.

FIG. 2 is a flowchart of a method for refining a presentation of an alternate query to a first query in accordance with the present invention. It involves a query pair filtering technique that considers the satisfaction the user perceives after selecting a suggested alternate query. The method comprises the steps of presenting a second query to a searcher that has submitted the first query, determining whether the searcher thereafter submits the second query, and determining whether the searcher thereafter utilizes information presented to the searcher if the searcher submits the second query. The method begins with step 210.

In step 210, the method presents an alternate query (QA), to a searcher who has submitted a first query. The alternate query QA is obtained from an alternate query database 260, which is preferably developed in accordance with the method described above in association with FIG. 1. However, any appropriate source of alternate queries can be used. The method then progresses to step 215.

In step 215, the method increments a count ($QA_{Presented}$) of total times the alternate query QA has been presented to searchers. The method then progresses to step 220.

In step 220, the method determines whether the searcher selects, i.e., submits, the alternate query QA. If the searcher selects the alternate query, then the method progresses to step 225. If the searcher does not select the alternate query, then the method branches to step 235.

In step 225, the method determines whether the searcher utilizes information that is presented to the user with the result of the search executed for the alternate query. Often, in addition to a search result, a search engine web site will display an advertisement or another form of collateral information, such as a new set of alternate queries. Step 225 is intended to determine whether the searcher has selected any feature that indicates the searcher's satisfaction with the presentation. For example, the searcher's selection of a link to further pursue the information would be indicative of his satisfaction. The objective here is to determine whether the searcher made use of information produced downstream from a click on an alternate query. If the searcher does not utilize the information, then the method branches to step 235. If the searcher does utilize the information, then the method progresses to step 230.

In step 230, the method increments a count ($I_{Used}$) of the total times the information has been utilized. The method then progresses to step 235.

In step 235, the method calculates a usage level (U) of the presented information. Over time, the searcher is but one of a plurality of searchers, each of whom has submitted the first query and thereafter submitted the alternate query. For each search, step 215 updates the count of total times the alternate query QA is presented $QA_{Presented}$, and step 230 updates the count of total times the information has been utilized $I_{Used}$. The usage level U is found by determining a ratio between the number of times the plurality of searchers further pursued, i.e., utilized, the information and a number of times the alternate query is presented to the plurality of searchers.

$$U := I_{Used}/QA_{Presented}$$

After completion of step 235, the method progresses to step 240.

In step 240, the method updates an alternate query usage database 250 based on the usage level U. The alternate query usage database contains data related to the usage level U of the alternate query QA, as well as the usage level of other alternate queries. The method then advances to step 245.

In step 245, the current pass of the method for refining a presentation of an alternate query terminates. However, periodically, the method will execute step 255.

In step 255, the method updates the alternate query database 260 using data from the alternate query usage database 250. If a second query is a candidate for an alternative query to a first query, step 255 determines whether to retain the second query as the candidate based on the usage level U. Step 255 eliminating the second query as the candidate if the usage level U is less than a predetermined level.

Figure 3:
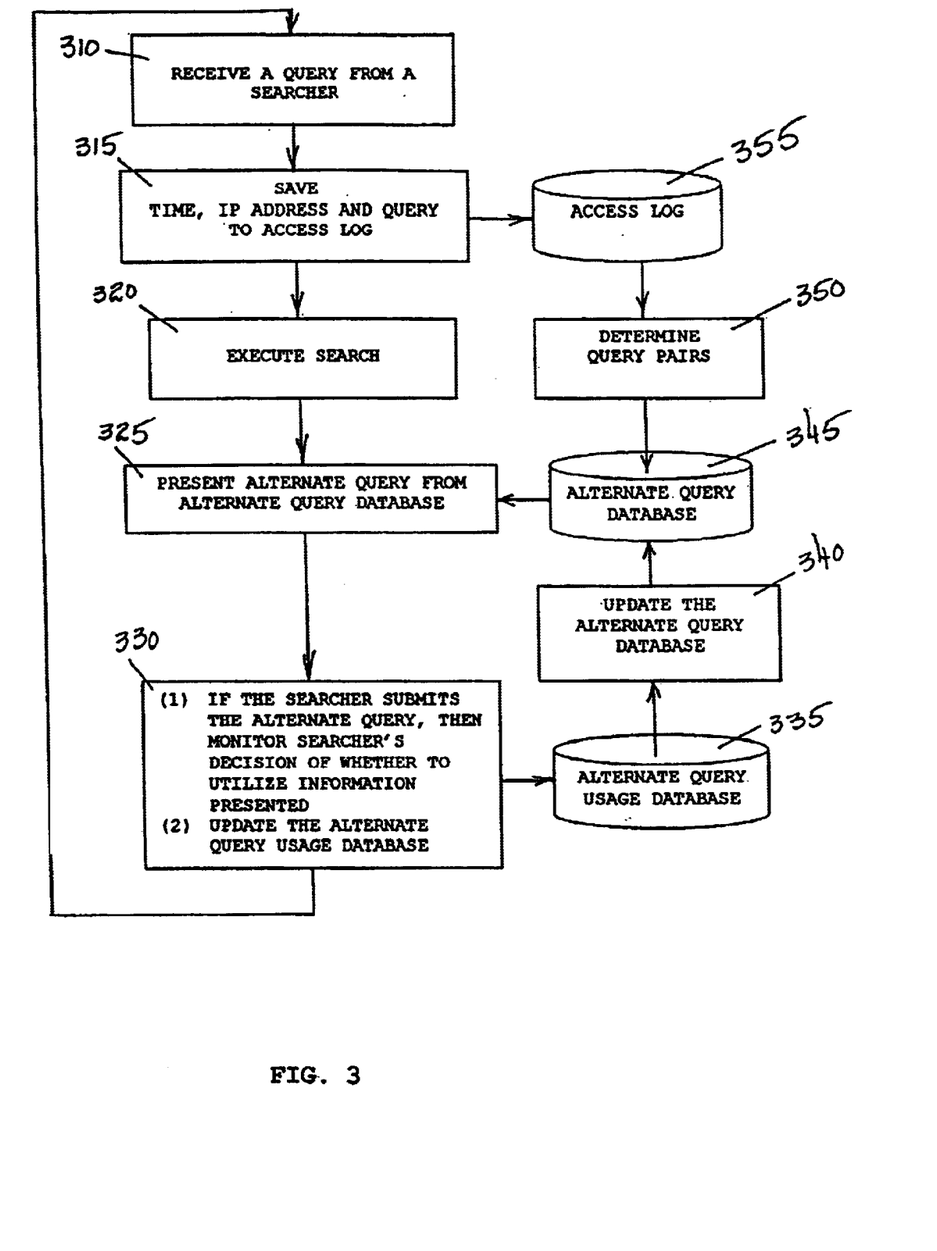
FIG. 3 is a flowchart of a method for refining a search for data in a database in accordance with the present invention.

FIG. 3 is a flowchart of a method for refining a search for data in a database in accordance with the present invention. It consolidates many of the features described above in association with FIGS. 1 and 2. The method includes the steps of determining that a first query and a second query have a likelihood of being submitted by a class of searcher, receiving a communication indicating that a searcher has submitted the first query in a search for data, and presenting the second query to the searcher.

A discussion of a current pass of the method begins with step 310. However, in practice, step 350 will have been previously executed. For the sake of clarity, the following paragraphs first describe a pass through steps 310 through 330, inclusive, and then describe step 355.

In step 310, the method receives a search query from a searcher. The method then progresses to step 315.

In step 315, the method saves, to an access log 355, the search query, an identifier indicating a source from which the search query was submitted, and a time at which the search query was submitted. In the preferred embodiment, the identifier is an Internet Protocol (IP) address. The method then progresses to step 320.

In step 320, the method executes a search based on the search query. The method then progresses to step 325.

In step 325, the method obtains an alternate query for the search query from an alternate query database 345. The method then progresses to step 330.

In step 330, the method monitors the searcher's use of the alternate query. If the searcher submits the alternate query, then step 330 monitors the searcher's decision of whether to utilize information that is presented with the search result. The method determines a usage level of the information and updates an alternate query usage database 335. The method then loops back to step 310 in anticipation of receiving a next query from the searcher.

Step 340 is executed asynchronously from steps 310 through 330. In step 340, the method updates the alternate query database 345 using data from the alternate query usage database 335. More particularly, where a second query is a candidate for an alternative query, step 340 determines whether to retain the second query based on the usage level of information, which was determined in step 330 and used to update alternate query usage database 335.

Step 350 is also executed asynchronously from steps 310 through 330. In step 350, the method obtains data from access log 355 and assembles query pairs, each comprising a first query and a second query that have a likelihood of being submitted by a class of searcher. The query pairs are stored into alternate query database 345.

Figure 4:
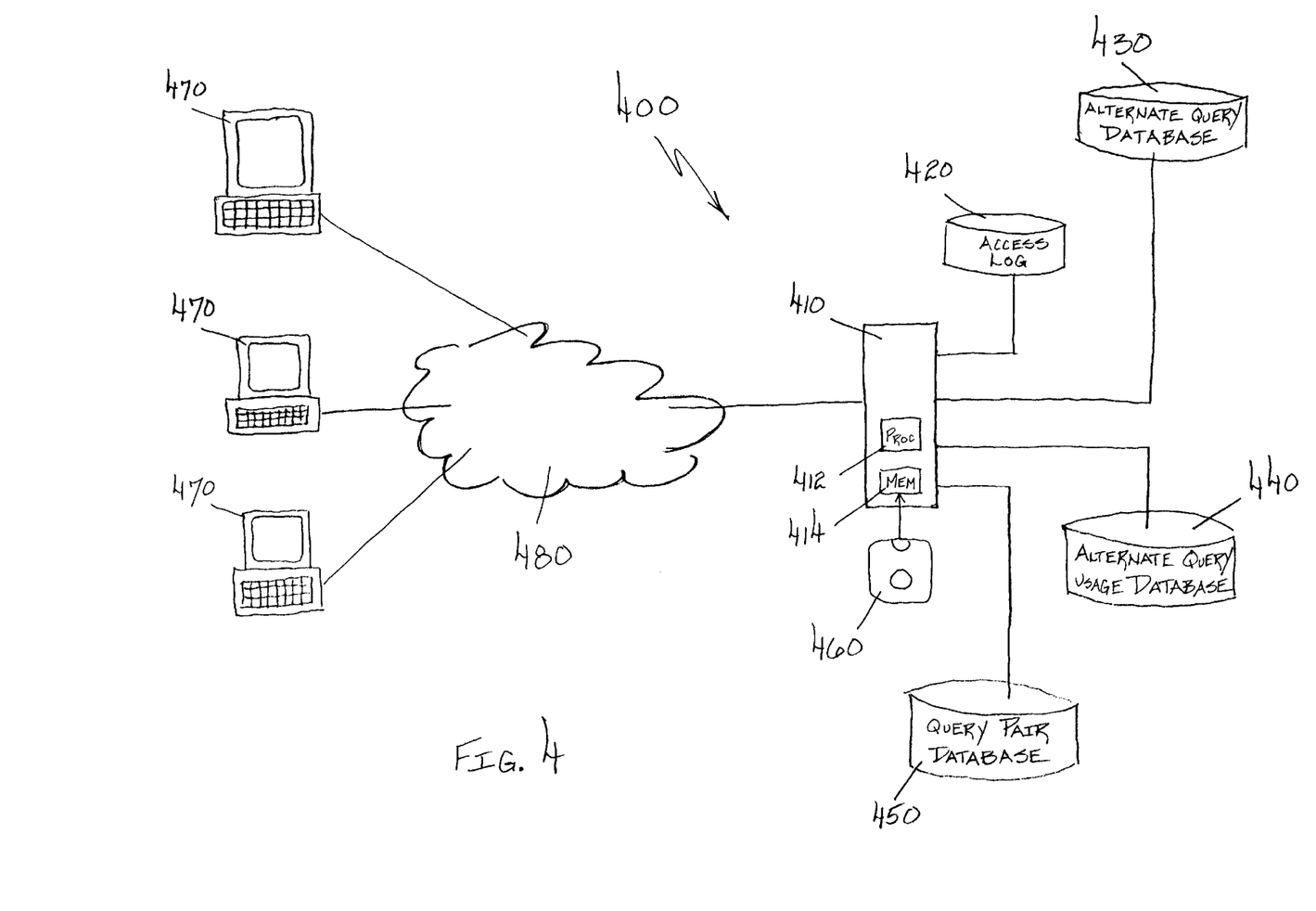
FIG. 4 is a block diagram of a system for collecting related queries, refining a presentation of an alternate query to a first query in accordance with the present invention, and refining a search for data in a database in accordance with the present invention.

FIG. 4 is a block diagram of a system 400 for collecting related queries, refining a presentation of an alternate query to a first query in accordance with the present invention, and refining a search for data in a database in accordance with the present invention. System 400 includes a local computer 410, and access log 420, an alternate query database 430, an alternate query usage database 440, and a query pair database 450.

Local computer 410 is coupled to a computer network 480, such as the Internet, to which a plurality of remote computers 470 is also coupled. Through computer network 480, a user at any of the remote computers 470 can communicate with local computer 410. Local computer 410 includes a search engine (not shown) to which the user can submit a search query to locate data in a database (not shown). Local computer 410 also includes a processor 412 and a memory 414. Memory 414 contains data and instructions, organized into one or more programs, for controlling processor 412 to execute the methods described above in association with FIGS. 1 through 3.

As stated earlier, system 400 includes a capability of collecting related queries. To perform this operation, processor 412 obtains a first query and a second query that have been submitted by a user of a remote computer 470 during a search for data. The first and second queries are stored into access log 420. Thereafter, processor 412 determines whether the first and second queries have a likelihood of being submitted by a class of searcher. If the first and second queries do have the likelihood of being submitted by a class of searcher, then processor 412 stores the first and second query as a query pair into query pair database 450 and alternate query database 430.

System 400 is also capable of refining a presentation of an alternative query to a first query. Processor 412 presents a second query to a searcher that has submitted the first query, and determines whether the searcher thereafter submits the second query. If the searcher submits the second query, processor 412 determines whether the searcher thereafter utilizes information presented to the searcher. Processor 412 determines a usage level of the information, and updates alternate query usage database 440.

Where a second query is a candidate for an alternative query to the first query, processor reads the usage level data from the alternate query database 440 and determines whether to retain the second query as the candidate and updates alternate query database 430.

To search for data in a database (not shown), processor 412 receives a communication indicating that a searcher at a remote computer 470 has submitted the first query in a search for data. Processor obtains a second query from alternate query database 430 and presents the second query to the searcher.

While the instructions required to execute the invention hereof are indicated as already loaded into the memory 414 of the local computer 410, they may be configured on a storage media, such as data memory 460, for subsequent loading into memory 414.

Local computer 410 can be implemented as a general purpose computer, such as a personal computer (PC) or a mainframe, or it may be a special purpose system in which processor 412 and memory 414 are configured in discrete circuitry or firmware. Local computer 410 may also be implemented as an array comprising multiple processors (not shown) and multiple memories (not shown), where various responsibilities of the method steps described above are distributed among the multiple processors. The databases 420, 440 and 450 may reside in one memory unit, or they may be contained within multiple memory units such as that found in an enterprise storage system.

Those skilled in the art, having the benefit of the teachings of the present invention may impart numerous modifications thereto. Such modifications are to be construed as lying within the scope of the present invention, as defined by the appended claims.

What is claimed is:

1. A method for collecting related queries, comprising the steps of:
    (a) obtaining a first query and a second query that have been submitted during a search for data, wherein said first query and said second query are regarded as a query pair;
    (b) determining a number of occurrences of said query pair that are submitted in a plurality of searches; and
    (c) using said number of occurrences to determine whether said first query and said second query have a likelihood of being submitted by a class of searcher.

2. The method of claim 1, wherein said class of searcher comprises either (1) a single searcher or (2) a plurality of searchers having a trait in common with one another.

3. The method of claim 1, wherein said step (c) determines whether said first query and said second query have a likelihood of being submitted by a single searcher performing a search for the same data.

4. The method of claim 1, wherein said likelihood is determined from a heuristic analysis of a plurality of searches.

5. The method of claim 1, wherein said likelihood is determined from a statistical analysis of a plurality of searches.

6. The method of claim 1, wherein said step (c) comprises determining whether both said first query and said second query have been submitted in a plurality of searches.

7. The method of claim 1, wherein said step (c) comprises determining whether a permutation of said first query and said second query has been submitted in a plurality of searches.

8. The method of claim 1, wherein said first and second queries are submitted from an identifiable source.

9. The method of claim 8, wherein said first and second queries are members of a set of queries from said identifiable source, and wherein a difference in time of submission between successive queries in said set is less than a predetermined value.

10. The method of claim 8, further comprising at least one of the following steps:
    (1) discarding said first and second queries if a rate of query submission from said identifiable source exceeds a predetermined rate, and
    (2) discarding said first and second queries if said identifiable source comprises a predetermined undesired source.

11. The method of claim 8, wherein said identifiable source is identified by at least one of:
   (1) an Internet Protocol (IP) address,
   (2) data from a hypertext transfer protocol (HTTP) management mechanism,
   (3) a cookie, and
   (4) an identifier assigned by a search engine.

12. The method of claim 1, wherein said obtaining step comprises:
   obtaining records, wherein each said record comprises a query and an identifier indicating a source from which said query was submitted; and
   sorting said records using said identifier as a key,
   wherein said first and second queries are obtained from records from a selected source.

13. The method of claim 12,
   wherein each said record further comprises a time at which said query was submitted,
   wherein said sorting step further comprises using said time as a secondary key,
   wherein said method further comprises determining a set of queries from said selected source, and
   wherein a difference in time between successive queries in said set is less than a predetermined value.

14. The method of claim 1, wherein said first query and said second query are obtained from a search engine access log.

15. The method of claim 1, wherein said first query and said second query are regarded as a query pair, and wherein said determining step comprises:
   determining a number of occurrences of said query pair that are submitted in a plurality of searches; and
   using said number of occurrences to determine whether said first query and said second query have said likelihood of being submitted by said class of searcher.

16. The method of claim 1, wherein said using step comprises finding that said first query and said second query have said likelihood of being submitted by said class of searcher if said number of occurrences is greater than a predetermined number.

17. The method of claim 1, wherein said using step comprises evaluating a ratio between said number of occurrences and an expected number of occurrences.

18. The method of claim 17, wherein said evaluating step applies a technique selected from the group consisting of a mutual information analysis and a chi-squared test.

19. The method of claim 1, wherein said first query and said second query are regarded as a first unique query pair, wherein said first query is the first query in N unique query pairs that have been submitted in a plurality of searches, and wherein said step (c) comprises:
   (c1) determining a number of occurrences of each of said N unique query pairs submitted in said plurality of searches; and
   (c2) using a number of occurrences of said first unique query pair and said number of occurrences of each of said N unique query pairs to determine whether said first query and said second query have said likelihood of being submitted by said class of searcher.

20. The method of claim 19,
   wherein each of said N unique query pairs has a mutual information value,
   wherein each of said N unique query pairs has a rank ordered according to said mutual information value,
   wherein a greatest rank corresponds to a greatest mutual information value, and
   wherein said step (c2) comprises finding that said first query and said second query have said likelihood of being submitted by said class of searcher if said rank of said first unique query pair is greater than a predetermined rank.

21. The method of claim 1, wherein said method further comprises processing a query in accordance with at least one step selected from the group consisting of:
   (1) converting a non-printable character to a space in said query,
   (2) replacing consecutive spaces with a single space in said query,
   (3) removing a quotation mark from said query,
   (4) converting an alpha character to its uppercase representation in said query,
   (5) discarding said query in a case where said query comprises a number of characters that is not within a predetermined range of numbers,
   (6) discarding said query in a case where said query comprises a uniform resource locator, and
   (7) discarding said query in a case where said query includes a term from the group consisting of a pornographic term, a violent term, a hateful term, an ethnically derogatory term, or a predetermined objectionable term.

22. The method of claim 1, wherein said first query is not identical to said second query.

23. The method of claim 1, wherein said first query is not a plural of said second query.

24. The method of claim 1, further comprising:
   receiving a communication indicating that a searcher has submitted one of said first query and said second query; and
   sending the other of said first query and said second query to said searcher.

25. The method of claim 1, further comprising using either said first query and/or said second query to aid in a selection of an advertisement.

26. The method of claim 1, further comprising using said first query to enhance a search related to said second query, and/or vise versa.

27. The method of claim 1, further comprising:
   presenting said second query to a searcher that has submitted said first query;
   determining whether said searcher thereafter submits said second query; and
   determining whether said searcher thereafter utilizes information presented to said searcher if said searcher submits said second query.

28. The method of claim 27, wherein said information comprises at least one of a search result or an advertisement.

29. The method of claim 27, wherein said searcher is one of a plurality of searchers that have submitted said first query and thereafter submitted said second query, and wherein said method further comprises:
   determining a usage level, by said plurality of searchers, of information that is thereafter presented to said plurality of searchers.

30. The method of claim 29, wherein said step of determining said usage level comprises determining a ratio between a number of times said plurality of searchers further pursue said information and a number of times said second query is presented to said plurality of searchers.

31. The method of claim 30, wherein said number of times said plurality of searchers further pursue said information is found from a number of times said plurality of searchers select a link to additional information.

32. The method of claim 29, wherein said second query is a candidate for an alternative query to said first query, and wherein said method further comprises determining whether to retain said second query as said candidate based on said usage level.

33. The method of claim 32, further comprising eliminating said second query as said candidate if said usage level is less than a predetermined level.

34. A system for collecting related queries, comprising:

means for obtaining a first query and a second query that have been submitted during a search for data, wherein said first query and said second query are regarded as a query pair;

means for determining a number of occurrences of said query pair that are submitted in a plurality of searches; and means for using said number of occurrences to determine whether said first query and said second query have a likelihood of being submitted by a class of searcher.

35. A storage media including instructions for controlling a processor that, in turn, collects related queries, said storage media comprising:

means for controlling said processor to obtain a first query and a second query that have been submitted during a search for data, wherein said first query and said second query are regarded as a query pair;

means for controlling said processor to determine a number of occurrences of said query pair that are submitted in a plurality of searches; and means for controlling said processor to use said number of occurrences to determine whether said first query and said second query have a likelihood of being submitted by a class of searcher.

* * * * *